United States Patent
Papin et al.

(10) Patent No.: US 8,824,816 B2
(45) Date of Patent: Sep. 2, 2014

(54) METHOD FOR ESTIMATING THE THROUGHPUT AND THE DISTORTION OF ENCODED IMAGE DATA AFTER ENCODING

(75) Inventors: Christophe Papin, Chateaubourg (FR); Didier Nicholson, Colombes (FR); Cyril Bergeron, Colombes (FR)

(73) Assignee: Thales, Neuilly sur Seine (FR)

( * ) Notice: Subject to any disclaimer, the term of this patent is extended or adjusted under 35 U.S.C. 154(b) by 448 days.

(21) Appl. No.: 13/266,654

(22) PCT Filed: Apr. 16, 2010

(86) PCT No.: PCT/EP2010/055070
§ 371 (c)(1),
(2), (4) Date: Jan. 9, 2012

(87) PCT Pub. No.: WO2010/124949
PCT Pub. Date: Nov. 4, 2010

(65) Prior Publication Data
US 2012/0121197 A1    May 17, 2012

(30) Foreign Application Priority Data

Apr. 28, 2009  (FR) ...................... 09 02068

(51) Int. Cl.
*G06K 9/36* (2006.01)
*H04N 7/26* (2006.01)
*H04N 7/50* (2006.01)
*H04N 7/30* (2006.01)

(52) U.S. Cl.
CPC ... *H04N 19/00933* (2013.01); *H04N 19/00866* (2013.01); *H04N 19/00854* (2013.01); *H04N 19/00169* (2013.01); *H04N 19/0006* (2013.01); *H04N 19/00781* (2013.01); *H04N 19/00818* (2013.01); *H04N 19/00333* (2013.01)
USPC ........................................................ 382/235

(58) Field of Classification Search
None
See application file for complete search history.

(56) References Cited

U.S. PATENT DOCUMENTS 6,658,019 B1 * 12/2003 Chen et al. ............... 370/465
7,145,966 B2 * 12/2006 Lai et al. .................. 375/330

(Continued)

FOREIGN PATENT DOCUMENTS

FR          2903272 A1     1/2008

OTHER PUBLICATIONS

Cho S et al.: "Optimal Error Protection for Real-Time Image and Video Transmission," IEEE Signal Processing Letters, IEEE Service Center, Piscataway, NJ, US, vol. 11, No. 10, Oct. 1, 2004, pp. 780-783.

(Continued)

*Primary Examiner* — Jingge Wu
(74) *Attorney, Agent, or Firm* — Baker Hostetler LLP (57) ABSTRACT

A method for estimating a bit rate and the distortion of at least one compressed image using at least one wavelet transform operation delivering at least one sub-band b containing coefficients, said sub-band being subdivided into at least one packet of coefficients associated with a compression quality layer, said packet also including a packet header and being transmitted through a propagation channel, said method including estimating a distortion $D_b^c$ linked to a compression of the coefficients of said packet, estimating a distortion $D'^c_b$ linked to a corruption or loss of said packet, estimating a compression bit rate $L_b$, estimating a sensitivity $\tilde{D}_b^c$ of said packet according to $D_b^c$ and $D'^c_b$ and the bit rate $L_b$, and estimating a distortion of said image linked to a decompression of said packet based on $\tilde{D}_b^c$.

12 Claims, 4 Drawing Sheets

(56) References Cited

U.S. PATENT DOCUMENTS

| | | | |
|---|---|---|---|
| 8,300,708 B2* | 10/2012 | Lamy-Bergot et al. | 375/240.27 |
| 2002/0114296 A1* | 8/2002 | Hardy | 370/332 |
| 2002/0144209 A1* | 10/2002 | Ariel et al. | 714/792 |
| 2002/0146074 A1* | 10/2002 | Ariel et al. | 375/240.27 |
| 2002/0157058 A1* | 10/2002 | Ariel et al. | 714/774 |
| 2003/0103523 A1* | 6/2003 | Frossard et al. | 370/465 |
| 2005/0047333 A1* | 3/2005 | Todd et al. | 370/229 |
| 2009/0304070 A1* | 12/2009 | Lamy-Bergot et al. | 375/240.02 |

OTHER PUBLICATIONS

David S Taubman Ed—Anonymous: "Localized Distortion Estimation from Already Compressed JPEG2000 Images," Image Processing, 2006 IEEE International Conference on, IEEE, PI, Oct. 1, 2006, pp. 3089-3092.

Marcellin M W et al.: "An overview of quantization in JPEG 2000" Signal Processing. Image Communication, Elsevier Science Publishers, Amsterdam, NL, vol. 17, No. 1, Jan. 1, 2002, pp. 73-84.

Mandal M K et al.: "Efficient Channel Protection for JPEG2000 Bitstream," IEEE Transactions on Circuits and Systems for Video Technology, IEEE Service Center, Piscataway, NJ, US, vol. 14, No. 4, Apr. 1, 2004, pp. 554-558.

Christophe Parisot, "Allocations basées modèles et transformée en ondelettes au fil de l'eau pour le codage d'images et de videos" [Model- and wavelet transform-based allocations on the fly for the coding of images and videos], thesis submitted at the University of Nice—Sophia Antipolis, Jan. 20, 2003. [discussed in paragraphs 0004, 0038, and 0052 of English-language specification].

Information technology—JPEG 2000 image coding system—Part 11: Wireless, ISO/IEC FCD 15444-11, Mar. 2005.

International standard ISO/IEC 15444-1 ITU-T recommendation T.800 (Aug. 2002).

* cited by examiner

METHOD FOR ESTIMATING THE THROUGHPUT AND THE DISTORTION OF ENCODED IMAGE DATA AFTER ENCODING

CROSS-REFERENCE TO RELATED APPLICATIONS

This application is a National Stage of International patent application PCT/EP2010/055070, filed on Apr. 16, 2010, which claims priority to foreign French patent application No. FR 09 02068, filed on Apr. 28, 2009, the disclosures of each of which are incorporated by reference in their entireties.

FIELD OF THE DISCLOSE SUBJECT MATTER

The subject of the present invention is a method for estimating the bit rate and the distortion of a compressed image data stream, said estimation being made after the compression step.

The field of application of the invention is that of the transmission of images through a constrained bit rate communication channel subject to errors, for example a microwave-type wireless channel. The limited bit rate available for the transmission necessitates a compression of the image data stream, and to this end, one of the image compression standards commonly used and to which the invention advantageously applies is the JPEG 2000 (Joint Photographic Expert Group) standard developed by the International Organization for Standardization, better known by the abbreviation ISO. The invention also applies in the context of multivendor communication networks that have numerous intermediate communication nodes for which it is important to be able to determine the characteristics of the transmitted image stream without having to perform a decompression step that is too costly in terms of computation complexity and delay introduced into the transmission. The knowledge of the characteristics such as the bit rate or the distortion of a compressed image stream are useful when seeking, for example, to modify them during a transcoding step. The possible uses of the invention relate to all the systems that implement transmissions of compressed image streams through propagation channels subject to errors, for example on-demand imaging systems, broadcasting systems, wireless sensor array systems or even video surveillance systems.

BACKGROUND

In a context of compressed image data transmission in which the available bit rate and the disturbances affecting the channel are variable, it is necessary to be able to adapt, at any time, the useful bit rate of a compressed data stream and its resistance to errors in order to adapt to the variations of the constraints due to the environment. To this end, it is therefore important to be able to estimate the characteristics of a compressed image stream such as the bit rate and the compression distortion, after the compression step and without decoding said stream. Another important characteristic to be estimated is the distortion of the decoded image resulting from the loss or from the corruption during its transmission of a packet contained in the compressed stream. This information makes it possible to measure the influence on the visual rendering of the propagation errors which affect the transmission channel and to deduce therefrom, notably, an appropriate strategy for protecting the compressed stream by adding redundancy.

The problem in estimating the bit rate and distortion of a compressed image stream is notably dealt with in the context of the bit rate/distortion allocation which aims to determine the best quantization parameters to be applied by an image compression mechanism in order to obtain a distortion on the decoded image that is as low as possible for a given bit rate. The document [1] proposes a number of bit rate and/or distortion allocation models for the coding of images and of videos, but it does not deal with the problem of estimating the distortion on image streams that are already compressed and with no prior knowledge of the encoded image.

There are methods for modeling the sensitivity to errors of a video stream such as that disclosed in the French patent [2], but the latter is limited to the case of application to the H.264 video standard. The method implemented in this patent presupposes, in addition, an interaction with the source coder and/or the knowledge, from the point of view of the receiver, of the original video sequence transmitted.

SUMMARY

In order to compensate, notably, the limitations of the prior art introduced previously, the invention proposes a solution that makes it possible to estimate the bit rate and distortion parameters of a sequence of images previously compressed and do so without necessitating decompression or prior knowledge of the encoded image. It relies notably on the use of a model for predicting the distortion of a decoded image when a packet contained in the transmitted stream is lost.

To this end, the subject of the invention is a method for estimating the bit rate and the distortion of at least one compressed image using at least one wavelet transform operation delivering at least one sub-band b containing coefficients, said sub-band being subdivided into at least one packet of coefficients associated with a compression quality layer, said packet also including a packet header and being transmitted through a propagation channel, said method being characterized in that it comprises at least the following steps:

a step of estimating the distortion $D_b^c$ linked to the compression of the coefficients of said packet, a step of estimating the distortion $D'_b^c$ linked to the corruption or to the loss of said packet during its transmission, a step of estimating the compression bit rate $L_b$ of said sub-band b, a step of estimating the sensitivity $\tilde{D}_b^c$ of said packet according to the distortions $D_b^c$ and $D'_b^c$ and the bit rate $L_b$ of said sub-band b and the quality layer of index i associated with said packet (106), a step of estimating the distortion of said image linked to the decompression of said packet based on its sensitivity $\tilde{D}_b^c$.

According to a variant embodiment of the invention, said packet is associated with a compression quality layer i and the step of estimating the sensitivity is performed using the following relationship:

$$\tilde{D}_b^c = \prod_{i=1}^{k} (1 - P_{errb}^{c_i}) \cdot D_b^{c_k} + \sum_{i=2}^{k} \left( P_{errb}^{c_i} \prod_{j=1}^{i-1} (1 - P_{errb}^{c_j}) \cdot D_b^{c_{i-1}} \right) + P_{errb}^{c_1} \cdot \frac{D'_b}{T_b} T_b^c,$$

in which $P_{errb}^{c_i}$ is the probability that the packet of index $c_i$ corresponding to the quality layer i of the sub-band b is errored, $D_b^{c_i}$ is its compression distortion, $D'_b$ is the corruption distortion of the sub-band b, $T_b^c$ and $T_b$ are the numbers of coefficients respectively contained in said packet c and said sub-band b.

According to a variant embodiment of the invention, the estimate of the distortion $D_b^c$ linked to the compression is obtained using the following relationship:

$$D_b^c = \frac{\Delta_b^c}{12} = \frac{\Delta_b \cdot \Delta tr_b^c}{12},$$

in which $\Delta_b$ is a quantization step linked to the compression and $\Delta tr_b^c$ is a quantization step linked to a step of truncation of the coefficients resulting from the compression.

According to a variant embodiment of the invention, the quantization step $\Delta tr_b^c$ is obtained from characteristic parameters of said sub-band b such as the number of quantization bits of the coefficients of said sub-band b, the number of zero bit planes, and the number of coding passes applied to the bit planes of said coefficients, the values of said characteristic parameters being determined from said headers of said compressed data stream.

According to a variant embodiment of the invention, the estimate of the distortion $D'_b$ linked to the corruption of the sub-band b is obtained using the following relationship:

$$D'_b = D_b \cdot 2^{2L_b}$$

in which $D_b$ is the distortion linked to the compression of the sub-band b.

According to a variant embodiment of the invention, the estimation of the bit rate $L_b$ of the sub-band b is obtained by dividing the sum of the lengths expressed in bytes of all the packets included in the sub-band b by the number of coefficients contained in the sub-band b.

According to a variant embodiment of the invention, the method also comprises the following substeps:
 a step of estimating the mean square error of said compressed image on the basis of the sensitivity $\tilde{D}_b^c$ of each packet of said compressed stream.
 a step of estimating the total compression bit rate L of said image obtained by calculating the sum of the bit rates $L_b$ of each sub-band b weighted by the ratio between the number of coefficients of the sub-band b and the size of the image in pixels.

According to a variant embodiment of the invention, the image compression mechanism implemented complies with the JPEG 2000 standard and said packet is a code block.

According to a variant embodiment of the invention, the method also comprises a transcoding step during which said estimates of bit rate $L_b^c$ and of sensitivity $\tilde{D}_b^c$ are used to eliminate, protect or adapt the bit rate of at least one of said packets of the compressed stream.

According to a variant embodiment of the invention, said transcoding step complies with the JPWL standard.

Also the subject of the invention is a use of the method described previously, characterized in that the distortions $D_b^c$ and $D'_b^c$ are used in order to determine a measurement of the quality of said image.

BRIEF DESCRIPTION OF THE DRAWINGS

Other features and advantages of the present invention will become more apparent from reading the following description in relation to the appended drawings which represent.

DETAILED DESCRIPTION

The JPEG 2000 (Joint Picture Expert Group 2000) standard, as described notably in [3], defines an image compression mechanism with or without loss using a wavelet transform.

Part 11 of this standard referenced by the abbreviation JPWL (JPEG 2000 Wireless) and described in the document [4] defines a syntax and tools that can be used to protect the data encoded in the JPEG 2000 format upstream of their transmission through a noise-affected microwave channel. This data protection phase can be performed after the compression phase in a step known to those skilled in the art as transcoding. An encoder compliant with the JPWL standard breaks down mainly into three modules: a JPEG 2000 standard encoder which delivers a compressed stream, a module for generating the sensitivity to errors of said compressed stream and a protection module that makes it possible to insert redundancy into the compressed stream based on the error sensitivity information. These last two modules are independent of the JPEG 2000 source coder and can be applied directly to a stream that has already been compressed during a transcoding step. This particular feature offers the advantage of allowing for the insertion of error protection at any point in the transmission chain and not necessarily immediately after the compression step.

Hereinafter in the description, the term code block is used with reference to a set of coefficients obtained by wavelet transform and belonging to a given sub-band. This term is introduced in the definition of the JPEG 2000 standard [3].

The use of the term sensitivity with reference to a packet of compressed image data or to a code block containing compressed image data designates the distortion on the decoded image resulting from the decompression of this packet or code block. The term "sensitivity" is used because here it concerns measuring the influence of errors affecting the data contained in said packet or code block on the visual rendering of the transmitted image.

The JPWL standard defines means for inserting error sensitivity information and redundancy information into the compressed stream. It notably describes the structure and the encapsulation of the data added after encoding. The error sensitivity information is used in particular in an unequal error protection mechanism which aims to distribute the protection by adding redundancy unequally to the different packets which make up the compressed stream so as to take account of the different impact of the propagation errors on each of these packets. For example, the packet headers containing signaling information or decompression parameters essential to the decoding of the stream intrinsically have a greater error sensitivity than certain parts of the compressed image data. In order to implement the type of unequal error protection mechanism introduced previously, it is necessary to define relevant sensitivity values assigned to the different packets which make up a compressed stream, which the JPWL standard does not describe. The present invention therefore proposes, to this end, a method for estimating the bit rate and the distortion of a compressed image stream that makes it possible to differentiate the packets that make up a JPEG 2000 code stream according to their error sensitivity.

Figure 1:
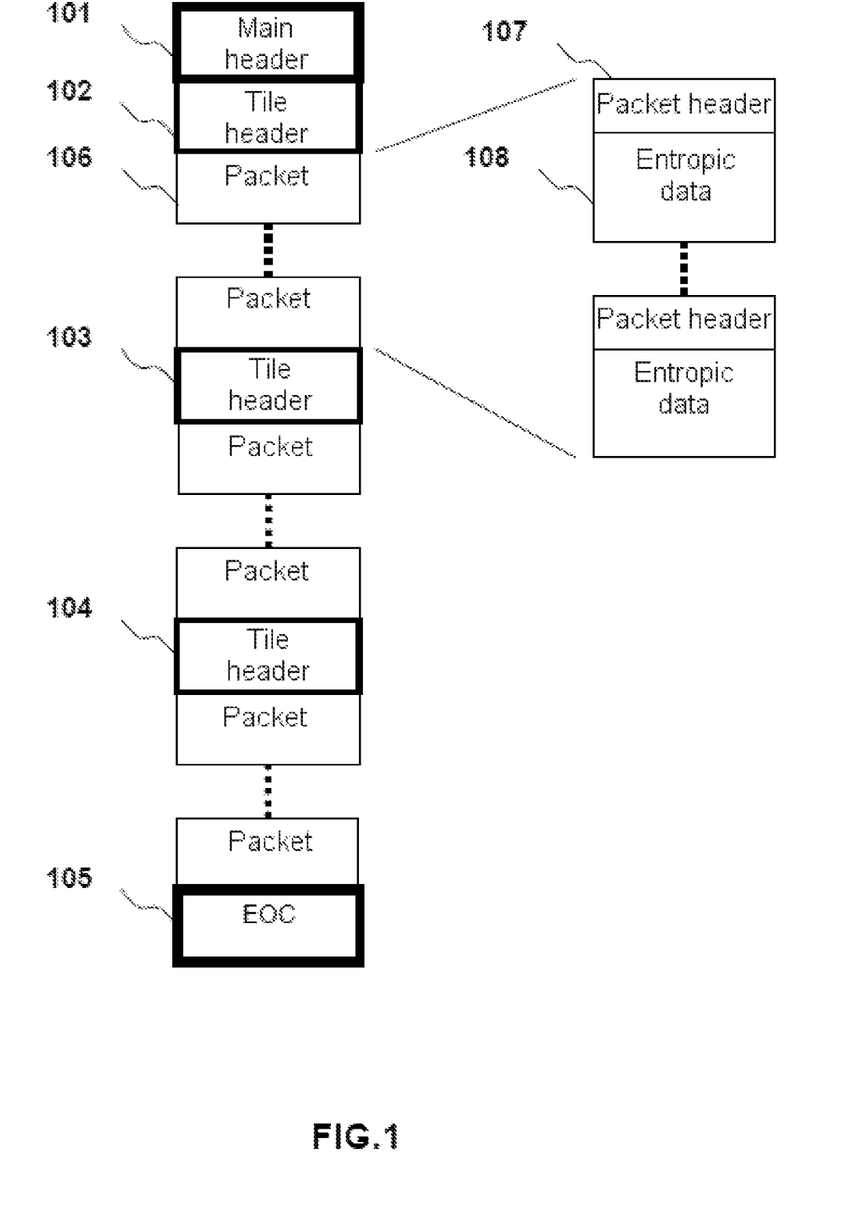
FIG. 1, an illustration of the syntax of a JPEG 2000 code stream.

FIG. 1 schematically represents the structure of a data stream in the format resulting from the JPEG 2000 compression of an image. This stream is notably made up of a main header 101 followed by one or more tile headers 102, 103, 104 which delimit the data associated with a tile which is a rectangular area of the image concerned defined as such by the JPEG 2000 standard. A tile header 101 is followed by a number of packets 106, each of which comprises a packet header 107 and entropic data 108 associated with an area of the image and with a sub-band. A packet 107 may contain a number of code blocks. A JPEG 2000 code stream always ends with an end-of-stream marker 105, known by the term "End of Codestream" EOC.

Figure 2:
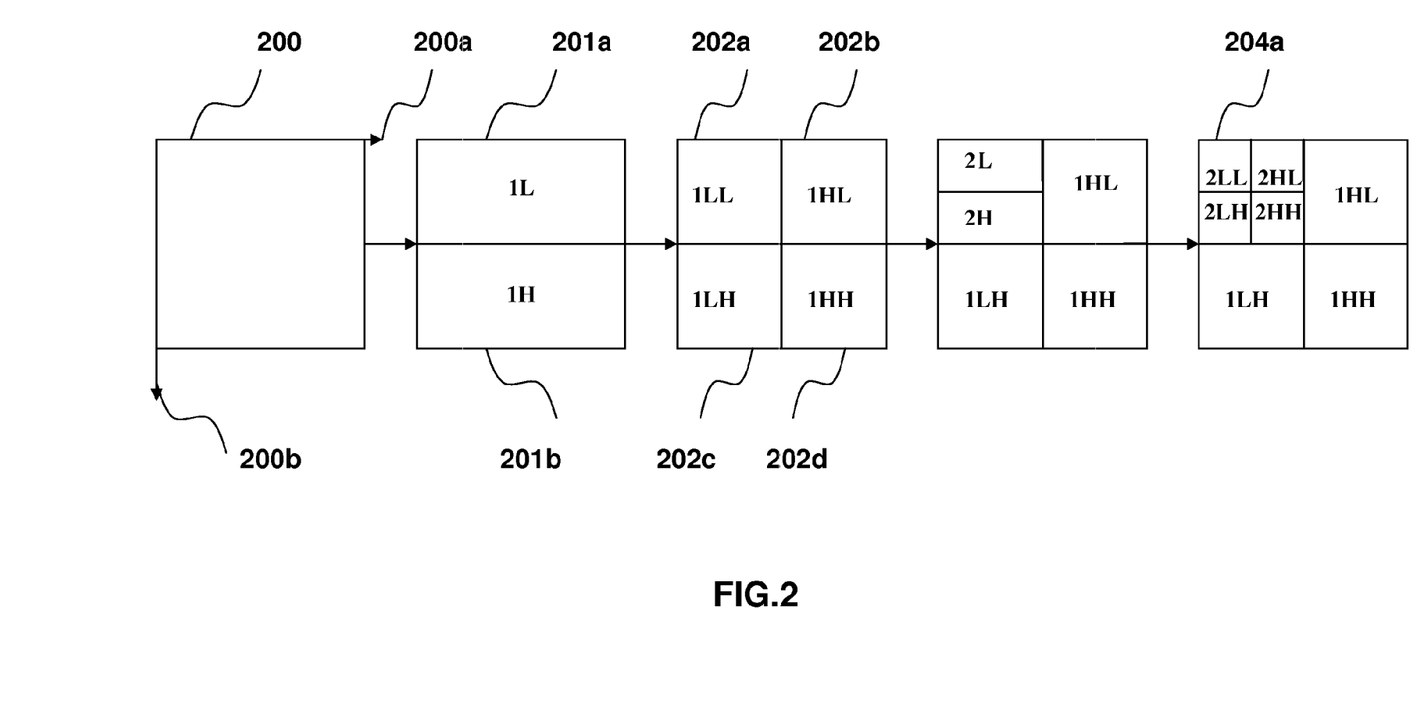
FIG. 2, a representation of the result of a wavelet transform on two resolution levels, FIG. 3, a representation of the notion of bit plane in a code block, FIG. 4, an example of a system suitable for executing the steps according to the invention.

FIG. 2 schematically represents the principle known to those skilled in the art of the decomposition of an image into sub-bands following a wavelet transform, a technique known in the field of digital data compression. An image 200 of given resolution is subjected to a first wavelet decomposition step culminating in the sub-bands 201a and 201b. This first step consists in applying, along the vertical axis 200b of the image 200, respectively a low-pass filtering that makes it possible to obtain a first sub-band 1L 201a then a high-pass filtering that makes it possible to obtain a second sub-band 1H 201b. In a second step, the same low-pass filtering and high-pass filtering operations are applied along the horizontal axis 200a in order to obtain a total of four sub-bands 1LL, 1HL, 1LH and 1HH. These four sub-bands correspond respectively to the original image with a resolution divided by two 202a, and three detail images 202b, 202c, 202d which give the high frequencies of the original image. The application of the mechanism described previously to the image 202a of resolution divided by two makes it possible to ultimately obtain an image 204 of resolution divided by four relative to the original image 200. Hereinafter in the description, a sub-band will designate the result of a high-pass or low-pass filtering step, according to a wavelet transform, applied to the original image 200 or to another sub-band 201a, 201b, 202a, 202b, 202c, 202d. The coefficients of a sub-band designate the coefficients obtained by a wavelet transform operation.

In a prior art method for compressing an image according to the JPEG 2000 standard, the coefficients of each sub-band obtained are then quantized and divided into a number of code blocks which contain the coefficients deriving from the wavelet decomposition. The code blocks correspond to the basic unit of the entropic coding applied by the JPEG 2000 standard and are coded independently. The coefficients of these code blocks are quantized and the result of this quantization can be represented three-dimensionally, in order to reveal the concept of bit planes. A JPEG 2000 packet may contain a number of code blocks.

In the example which is described below, the method for estimating the bit rate/distortion according to the invention is applied to a code block but it can be generalized to any packet containing compressed data associated with a sub-band obtained by a wavelet transform operation on an image.

Figure 3:
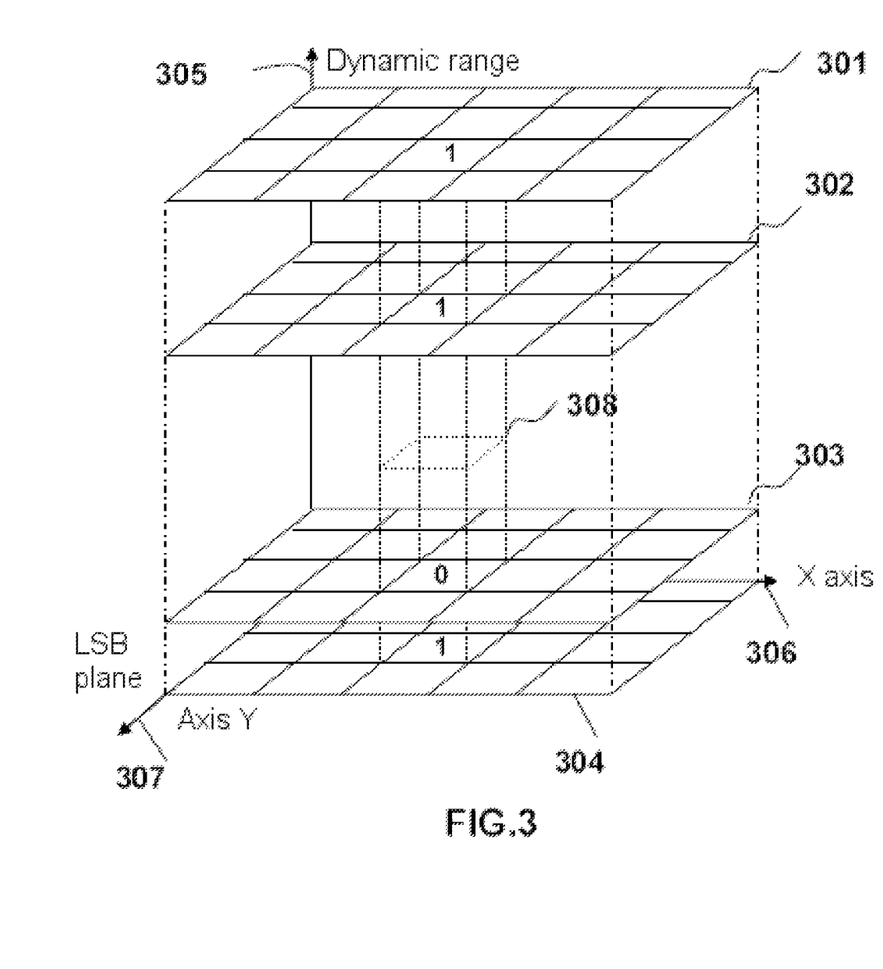

FIG. 3 illustrates a three-dimensional representation of the notion of bit planes. A set of coefficients, for example coefficients of a sub-band, are represented in a three-axis coordinate system. The first axis 305 represents the dynamic range of a coefficient, that is to say, the binary representation of the quantized coefficient. The other two axes 306, 307 correspond to the positions within the code block of the coefficient. A quantized coefficient has a given number of bits that are stored conventionally from the least significant bit (LSB) to the most significant bit (MSB). A bit plane 301, 302, 303, 304 corresponds to the bits of the same rank of all the coefficients of a code block. For example, the MSB plane 301 contains the most significant bits of all the coefficients for a considered code block. Similarly, the LSB plane 304 contains the least significant bits. A coefficient 308 is represented by all of its bits each belonging to a distinct bit plane.

In a compression step according to the JPEG 2000 standard, the quantized coefficients are then encoded, notably by an arithmetical coding performed in three passes and applied to each bit plane beginning with the plane of the most significant bit.

The method according to the invention notably consists in estimating the bit rate and the distortion of all or part of a compressed image stream, for example compressed according to the JPEG 2000 standard, on the basis of information extracted from the different headers of this stream. In particular, the invention applies to one or more code blocks or to any set containing a plurality of coefficients derived from a wavelet transform.

The distortion of an image or part of an image transmitted through a wireless channel then decompressed results from two distinct phenomena. First of all, there is a distortion D that is inherent to the compression operation which affects each code block even if the latter is correctly received on completion of its transmission over a given wireless channel. This first distortion is essentially due to the quantization operations which take place during the compression step and which induce information losses. Then, there is a distortion D' linked to the loss or to the corruption of a packet or of a code block during the transmission over a channel subject to propagation errors. From the two distortion terms D and D' introduced, it is possible to determine the intrinsic sensitivity of a compressed data packet using the following relationship:

$$\tilde{D} = (1 - P_{err}) \cdot D + P_{err} \cdot D' \tag{1}$$

with $P_{err}$ being the probability that the packet transmitted over a transmission channel is not correctly received.

The sensitivity of a packet designates the contribution of said packet for the distortion created on the decoded image.

The method according to the invention notably makes it possible to determine, for each packet, the two distortion terms D and D' useful for the calculation of the intrinsic sensitivity of said packet.

The document [1] introduces an asymptotic model for evaluating the compression distortion of a sub-band as a function of the quantization pitch used to quantize the coefficients of this sub-band obtained by a wavelet transform step. Assuming a high resolution, it is known that the probability density of the coefficients of a wavelet transform can be approximated by a generalized zero mean Gaussian distribution for each sub-band. The coefficients of a wavelet transform are assumed to be independent and identically distributed in each sub-band. The assumptions of stationarity and of ergodicity are also retained so as to be able to estimate the statistical characteristics of the different sub-bands simply. The distortion D due to the compression can be linked to the quantization step Δ using the following relationship:

$$D = \frac{\Delta^2}{12} \tag{2}$$

In order to determine the distortion linked to the scalar quantization and to the truncation step applied during the bit plane coding of the wavelet transform coefficients, the relationship (2) is applied to a code block. The aim of the truncation step is notably to reduce the bit rate by eliminating the least significant bit planes. In the context of a compression compliant with the JPEG 2000 standard, this step is implemented by a bit rate/distortion allocation mechanism. This can be likened to a scalar quantization because the truncation of N bit planes is equivalent to a division by $2^N$. The equivalent quantization step $\Delta_b{}^c$ associated with a code block c of sub-band b is thus obtained using the following relationship:

$$\Delta_b{}^c = \Delta_b \cdot \Delta tr_b{}^c \qquad (3)$$

with $\Delta_b$ being the quantization step applied to the sub-band b and $\Delta tr_b{}^c$, the quantization step linked to the truncation step. The quantization step applied to a sub-band b is defined in the JPEG 2000 standard by the following relationship:

$$\Delta_b = 2^{R_B - \varepsilon_b}\left(1 + \frac{\mu_b}{2^{11}}\right) \qquad (4)$$

in which $R_B$ is the nominal dynamic range of the sub-band b, $$R_B = R_I + \log_2(\Delta_b) \qquad (5)$$

The values of the different parameters $R_I$, $\Delta_b$, $\mu_b$ and $\gamma_b$ useful for the determination of the quantization step of the sub-band b can be extracted from the headers of the packets of the compressed stream in the JPEG 2000 format.

$R_I$ is the number of bits used to represent the components of the pixels of the source image and can be determined by the marker SIZ (Image and Tile Size Marker) present in the main header 101 and which defines, according to the JPEG 2000 standard, the size of a tile and of the associated image.

$\varepsilon_b$ is the exponent of the quantization step of the sub-band b which can be determined from the marker QCC (Quantization Component Marker) included in the main header 101 and in the tile header 102, 103, 104.

$\mu_b$ is the mantissa of the quantization step of the sub-band b and is specified in the marker QCD (Quantization Default Marker) present in the main header 101 and in the tile header 102, 103, 104.

$\gamma_b$ is the gain of the sub-band b which is defined in the JPEG 2000 standard according to the type of sub-band.

In order to determine the second term $\Delta tr_b{}^c$ necessary for the calculation of the quantization step associated with a code block, it is essential to know the number of bit planes truncated during the bit rate and distortion allocation step according to the JPEG 2000 standard. This information can be obtained from the number of bit planes retained which can be calculated using the data stored in the headers of the packets. Let nb_bitplanes$_b{}^c$ be the number of bit planes retained by the bit rate/distortion allocation algorithm implemented in the context of a compression compliant with the JPEG 2000 standard and nb_bitplanes_tr$_b{}^c$ be the number of bit planes truncated in the code block of index c of the sub-band of index b. Each bit plane is coded in three passes, except for the first bit plane which is coded in one pass and the sign bit which is coded in the first pass, called significance propagation. The last bit plane is assumed to be retained if the result of at least one of the coding passes applied to this bit plane is retained. Finally, the number of zero bit planes which is used to determine the most significant bit is coded separately.

The number of bit planes retained nb_bitplanes$_b{}^c$ is therefore given by the following relationship:

$$\text{nb\_bitplanes}_b^c = IMSB_b^c + \left\lceil \frac{\text{nb\_passes}_b^c - 1}{3}\right\rceil + 2, \qquad (6)$$

in which $IMSB_b{}^c$ is the number of zero bit planes situated before the plane of the most significant bit. The value of this number of zero bit planes can be extracted from the header of the packet containing the code block of index c of the sub-band b, nb_passes$_b{}^c$ is the number of coding passes retained by the bit rate/distortion allocation algorithm which can also be extracted from the header of the packet.

The number of truncated bit planes corresponds to the difference between the number of bits $M_b$ remaining after the scalar quantization step and the number of bits retained during the bit rate/distortion allocation step nb_bitplanes$_b{}^c$.

$$\text{nb\_bitplanes\_tr}_b{}^c = M_b - \text{nb\_bitplanes}_b{}^c, \qquad (7)$$

The number of bits $M_b$ can be obtained from the markers QCC and QCD present in the main header 101 and the tile headers 102, 103, 104, 105.

From the relationship (7) the quantization step linked to the truncation can be deduced therefrom:

$$\Delta tr_b{}^c = 2^{\text{nb\_bitplanes\_tr}_b{}^c} \qquad (8)$$

From the relationships (2) to (8) introduced previously, it is possible to determine the distortion $D_b{}^c$ induced by the compression step of a JPEG 2000 coder for a code block of index c belonging to the sub-band of index b according to information extracted from the markers present in the headers of the packet which contains this code block. The following relationships summarize the dependencies, represented via the functions f and g, between the distortion, the two quantization terms and the information extracted from the headers:

$$D_b^c = \frac{\Delta_b^c}{12} = \frac{\Delta_b \cdot \Delta tr_b^c}{12} \qquad (9)$$

$$\Delta_b = f(R_B, \varepsilon_b, \mu_b, \text{gain}_b)$$

$$\Delta tr_b^c = g(M_b, IMSB_b^c, \text{nb\_passes}_b^c)$$

The second step of the method according to the invention consists in estimating the distortion linked to the impact of the loss of a JPEG 2000 packet during its transmission. This distortion depends partly on the notion of quality layer associated with a code block. A quality layer of index i corresponds to the bit plane of rank i as explained previously with reference to FIG. 3. As an example, the plane of the most significant bits corresponds to a basic quality layer whereas any supplementary bit plane makes it possible to introduce a supplementary quality layer also called enhancement or refinement quality layer.

Two possibilities can arise. First of all, if the lost packet is associated with an enhancement quality layer, then the distortion $D'_b{}^{ci}$ resulting from the loss of this packet is equal to the compression distortion $D_b{}^{ci-1}$ of a lower quality layer transmitted correctly. If $c_i$ is the index of the code block corresponding to the $i^{th}$ quality layer of a sub-band of index b, this result can be explained using the following relationship:

$$D'_b{}^{ci} = D_b{}^{ci-1} \text{ for } i > 1 \qquad (10)$$

If, on the other hand, the lost packet is associated with a basic quality layer, then the resulting distortion is equivalent to the energy of the code block of the sub-band concerned, that is to say, to the compression distortion induced by a quantization step of infinite size.

To estimate, in the latter case, the distortion induced upon the corruption or the loss of a code block, it is assumed that the coefficients derived from the wavelet transform of a sub-band b follow a generalized Gaussian statistical law of variance $\sigma_b$ and of parameter $\alpha_b$. It is known to those skilled in the art, notably through the document [1], that a relationship exists between the bit rate $L_b$ of the sub-band b and the distortion $D_b$ due to the compression in each sub-band b:

$$D_b = F(\alpha_b, \sigma_b) \times 2^{-2L_b} \qquad (11)$$

with $F(\alpha_b, \sigma_b)$ being a function dependent on the statistic of a generalized Gaussian distribution associated with a sub-band b.

The total distortion $D_b$ of the sub-band b is obtained by averaging the compression distortions $D^c_b$ of each code block of the sub-band b estimated previously using the relationships (9) and taking into account the number $T_b$ of coefficients of the sub-band b:

$$D_b = \frac{\sum_{c=0}^{Ncb_b-1} D^c_b}{T_b}, \quad (12)$$

in which $Ncb_b$ is the number of code blocks contained in the sub-band b.

The relationship (11) also requires the bit rate $L_b$ of the sub-band b to be determined, which is, moreover, also necessary in order to model the bit rate/distortion curve of the sub-band b. The bit rate $L_b$ is equal to the sum of the bit rates $L_b^c$ of each code block belonging to the sub-band b and is obtained using the following relationship:

$$L_b = \sum_{c=0}^{Ncb_b-1} L_b^c = \frac{\sum_{c=0}^{Ncb_b-1} L'^c_b}{T_b} \quad (13)$$

in which $L'^c_b$ is the length in bytes of the code block of index c which can be extracted from the header of the packet containing said code block. The bit rate $L_b$ is expressed as a number of bits per pixel.

The distortion linked to the loss of the sub-band b is equivalent to the resultant distortion when the sub-band is not transmitted, that is to say when its bit rate $L_b$ has the value 0, so it is possible to write:

$$D'_b = F(\alpha_b, \sigma_b) = D_b \cdot 2^{2L_b} \quad (14)$$

From the relationships (11) to (14), it is therefore possible to determine $F(\alpha_b, \sigma_b)$ then $D'_b$.

Finally, the distortion $D'^{c_1}_b$ resulting from the loss of a code block of index $c_1$ corresponding to the first quality layer, that is to say the basic quality layer, is written:

$$D'^{c_1}_b = \frac{D'_b}{T_b} T^c_b \quad (15)$$

in which $T^c_b$ is the number of coefficients contained in the code block of index c of the sub-band b.

The relationships (10) and (15) obtained previously therefore make it possible to determine the distortion resulting from the loss of a code block, regardless of the quality layer concerned.

If it is assumed that the compression according to the JPEG 2000 standard has generated k quality layers for one and the same code block c of a sub-band b, then the total distortion of said code block resulting from the encoding then from the transmission through a noise-affected channel can be written using the following relationship obtained in light of the relationship (1):

$$\tilde{D}^c_b = \prod_{i=1}^{k}(1 - P^{ci}_{errb}) \cdot D^{ck}_b + \sum_{i=1}^{k}\left(P^{ci}_{errb}\prod_{j=1}^{i-1}(1 - P^{cj}_{errb}) \cdot D'^{ci}_b\right) \quad (16)$$

in which $P_{err}{}^{ci}_b$ is the probability that the code block of index c corresponding to the $i^{th}$ quality layer of the sub-band b is errored and $\Pi$ designates a product.

The relationship (16) can also be written as follows:

$$\tilde{D}^c_b = \prod_{i=1}^{k}(1 - P^{ci}_{errb}) \cdot D^{ck}_b + \sum_{i=2}^{k}\left(P^{ci}_{errb}\prod_{j=1}^{i-1}(1 - P^{cj}_{errb}) \cdot D^{ci-1}_b\right) + P^{c1}_{errb} \cdot \frac{D'_b}{T_b}T^c_b \quad (17)$$

The relationship (17) therefore makes it possible to determine the intrinsic sensitivity of each JPEG 2000 code block from the information contained in the headers present in the compressed stream. This sensitivity information can be used in various ways. Notably, this information makes it possible to implement a differentiated error protection mechanism by adding redundancy according to the JPWL standard or any other mechanism that makes it possible to allocate a correcting code to each area of the compressed stream for which there has previously been determined an estimation of its sensitivity and of its bit rate using the method according to the invention. It is also possible to choose not to transmit a code block which exhibits an excessively high sensitivity by seeking to minimize the overall distortion of an image in light of a total bit rate constraint.

From the relationships established previously, it is possible to deduce, for an entire image, the total bit rate $L_{tot}$ and the total mean square error $MSE_{tot}$ by taking account of the reconstruction gains of the synthesis filters.

$$MSE_{tot} = \sum_{b=0}^{Nsb-1} \alpha_b D_b \quad (18)$$

in which $\alpha_b$ is the gain of the reconstruction filter of the sub-band b and Nsb is the number of sub-bands in an image.

The total bit rate of the image can also be estimated from the following relationship:

$$L_{tot} = \sum_{b=0}^{Nsb-1} a_b L_b \quad (19)$$

with $a_b$ being the ratio between the number of coefficients of the sub-band b and the size of the image in pixels.

In the case of a transmission with added redundancy, it is necessary to take account of the added redundancy in the calculation of the total bit rate and of the influence of the correcting code associated with this redundancy in determining the probability of error of a code block.

Generally, the invention makes it possible to adapt the compressed data stream as a function of the nature and the state of the transmission channel.

Figure 4:
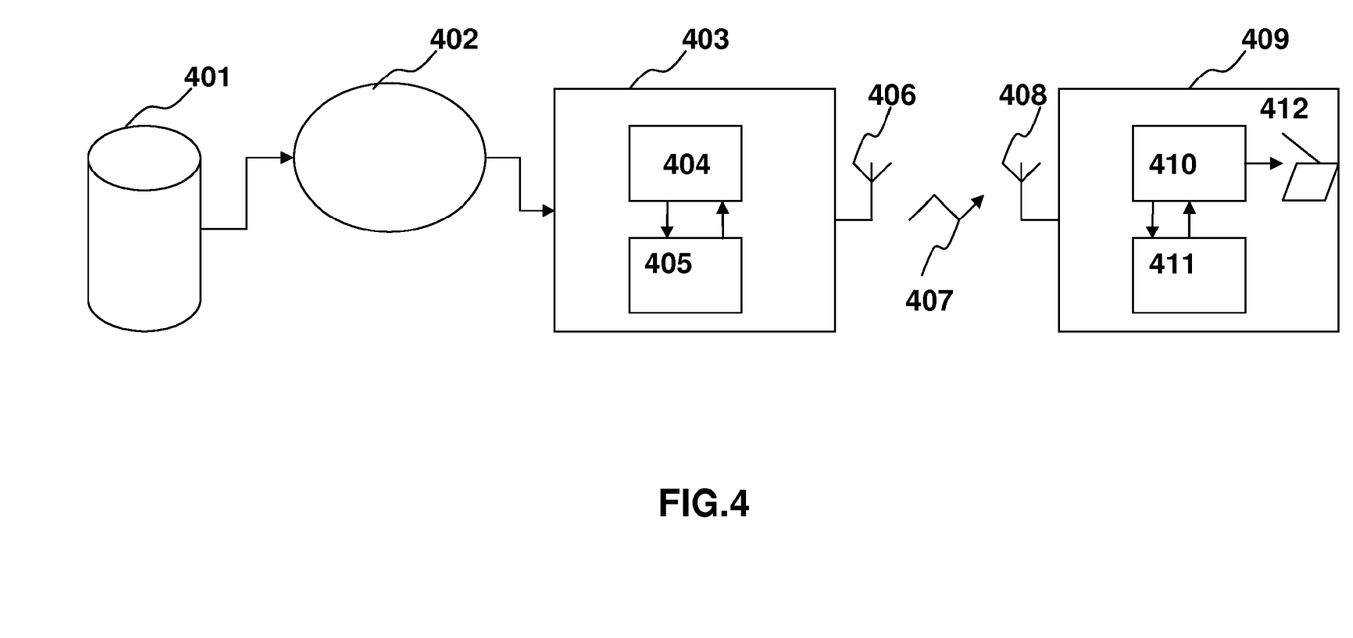

FIG. 4 schematically represents an exemplary system suitable for executing the steps of the method according to the invention.

A server 401 for broadcasting compressed images, for example a JPEG 2000 server, transmits a stream of compressed images through a network 402 which is linked to a base station 403 comprising a module 404 for transcoding the received stream and radio access layers 405. The transcoding module 404 is suitable for implementing the bit rate/distortion estimation method according to the invention from the compressed stream received. This module may also receive, from the radio access layers 405, information on the state of the channel or on the available bit rate, making it possible to use the bit rate/distortion estimation according to the invention in order to adapt the compressed stream or to apply an error protection mechanism to it.

The base station 403 is linked to a transmission antenna 406 suitable for transmitting the compressed image stream through a wireless channel 407 to a mobile station 409 which receives said stream via a receiving antenna 408. The mobile 409 notably includes radio access layers 411 and an image decoder 410 suitable for decompressing the received stream and producing one or more images 412.

The method according to the invention notably offers the advantage of estimating the bit rate and the distortion of a stream of images without applying decompression of this stream. The bit rate and distortion estimates according to the invention make it possible to adapt the data stream according to the transmission conditions and notably to apply an error protection strategy which takes account of the intrinsic sensitivity of each area of the compressed stream. The invention also has the advantage of making it possible to estimate, after the compression, the impact of the loss of a packet of image data.

The method according to the invention can be applied directly at the level of the source coder or be incorporated in a transcoding module or even at any other level of a protocol layer such as the transport or network layer. This advantage makes it possible to adapt the data stream at any point in the overall transmission chain. Finally, the invention can be incorporated in a so-called quality of service mechanism, known by the abbreviation QoS. In particular, the invention makes it possible to estimate a measurement of the image quality according to the distortions $D_b^c$ and $D'_b^c$ weighted by a factor of psycho-visual type. This measurement, or metric, of the psycho-visual quality of an image can be used in a service quality management mechanism since it gives assess, at each point or node of the transmission chain of an image, to an estimation of the impact due to the preceding steps in terms of degradations of the psycho-visual quality of the image.

REFERENCES

[1] Christophe Parisot, "Allocations basées modèles et transformée en ondelettes au fil de l'eau pour le codage d'images et de videos" [Model- and wavelet transform-based allocations on the fly for the coding of images and videos], thesis submitted at the University of Nice—Sophia Antipolis, 20 Jan. 2003.

[2] Cyril Bergeron, Catherine Lamy-Bergot, "Procédé permettant de déterminer des paramètres de compression et de protection pour la transmission de données multimédia sur un canal sans fils" [Method for determining compression and protection parameters for the transmission of multimedia data over a wireless channel], French Patent FR 2903272.

[3] International standard ISO/IEC 15444-1 ITU-T recommendation T.800 (08/2002).

[4] Information technology—JPEG 2000 image coding system—Part 11: Wireless, ISO/IEC FCD 15444-11, 03/2005.

The invention claimed is:

1. A method for estimating a bit rate and a distortion of at least one image compressed using at least one wavelet transform operation delivering at least one sub-band b containing coefficients, said sub-band b being subdivided into at least one packet of coefficients associated with a compression quality layer, said packet also including a packet header and being transmitted through a propagation channel, said method comprising:
  estimating a distortion $D_b^c$ caused by a compression of the coefficients of said packet;
  estimating a compression bit rate $L_b$ of said sub-band b;
  estimating a distortion $D'_b^c$ caused by corruption or loss of said packet during transmission of said packet by:
    equaling, if the corrupted or lost packet belongs to an enhancement quality layer, the distortion $D'_b^c$ to a distortion $D_b^{c_{i-1}}$ caused by compression of a lower quality layer that is correctly transmitted, or
    equaling, if the corrupted or lost packet belongs to a base quality layer, the distortion $D'_b^c$ to $$D_b'^c = \frac{D_b'}{T_b} T_b^c,$$

where $D'_b$ is a distortion caused by the corruption of the sub-band b, $T_b$ is a number of coefficients in the sub-band b, and $T_b^c$ is a number of coefficients in block-code c of the sub-band b;
  estimating a sensitivity $\tilde{D}_b^c$ of said packet according to the distortions $D_b^c$ and $D'_b^c$; and
  estimating a distortion of said image caused by decompression of said packet based on the sensitivity $\tilde{D}_b^c$ of said packet.

2. The method according to claim 1, wherein the sensitivity $\tilde{D}_b^c$ is estimated using the following relationship:

$$\tilde{D}_b^c = \prod_{i=1}^{k}(1 - P_{errb}^{c_i}) \cdot D_b^{c_k} + \sum_{i=2}^{k}\left(P_{errb}^{c_i} \prod_{j=1}^{i-1}(1 - P_{errb}^{c_j}) \cdot D_b^{c_{i-1}}\right) + P_{errb}^{c_1} \cdot \frac{D_b'}{T_b} T_b^c,$$

in which $P_{errb}^{c_i}$ is a probability that the packet of index $c_i$ corresponding to the quality layer i of the sub-band b is errored, $D_b^{c_i}$ is a compression distortion of the packet of index $c_i$, and $T_b^c$ and $T_b$ are numbers of coefficients respectively contained in said packet c and said sub-band b.

3. The method according to claim 2, wherein the distortion $D_b^c$ caused by the compression is estimated using the following relationship:

$$D_b^c = \frac{\Delta_b^c}{12} = \frac{\Delta_b \cdot \Delta tr_b^c}{12},$$

in which $\Delta_b$ is a quantization caused by the compression and $\Delta tr_b^c$ is a quantization caused by truncation of the coefficients resulting from the compression.

4. The method according to claim 3, further comprising obtaining the quantization $\Delta tr_b^c$ from characteristic parameters of said sub-band b selected from the group consisting of a number of quantization bits of the coefficients of said sub-band b, a number of zero bit planes of said sub-band b, and a number of coding passes applied to the bit planes of said coefficients of said sub-band b, wherein the values of said characteristic parameters are determined from said header.

5. The method according to claim 2, wherein the distortion $D'_b$ caused by the corruption of the sub-band b is estimated using the following relationship:

$$D'_b = D_b \cdot 2^{2L_b}$$

in which $D_b$ is a distortion caused by compression of the sub-band b.

6. The method according to claim 1, wherein the bit rate $L_b$ of the sub-band b is estimated by dividing a sum of lengths expressed in bytes of all packets included in the sub-band b by the number of coefficients contained in the sub-band b.

7. The method according to claim 1, further comprising:
estimating a mean square error of said compressed image based on the sensitivity $\tilde{D}_b^c$ of each packet of said compressed image; and
estimating a total compression bit rate L of said image by calculating a sum of the bit rates $L_b$ of each sub-band b weighted by a ratio between the number of coefficients of the sub-band b and the size of the image in pixels.

8. The method according to claim 1, wherein the image compression complies with the JPEG 2000 standard and said packet is a code block.

9. The method according to claim 1, further comprising transcoding by estimating bit rate $L_b^c$ and sensitivity $\tilde{D}_b^c$ to eliminate, protect, or adapt a bit rate of at least one of said packets of the compressed image.

10. The method according to claim 9, wherein said transcoding complies with the JPWL standard.

11. The method according to claim 1, wherein the distortions $D_b^c$ and $D'^c_b$ are used to determine a measurement of the quality of said image.

12. A source coder comprising a processor configured to implement the method according to claim 1.

* * * * *